United States Patent [19]
Yang et al.

[11] Patent Number: 5,643,981
[45] Date of Patent: Jul. 1, 1997

[54] FLAMEPROOF THERMOPLASTIC RESIN COMPOSITIONS

[75] Inventors: Sam-Joo Yang; Bok-Nam Jang, both of Seoul, Rep. of Korea

[73] Assignee: Cheil Industries, Inc., Taegu, Rep. of Korea

[21] Appl. No.: 333,073

[22] Filed: Nov. 1, 1994

[30] Foreign Application Priority Data

Sep. 5, 1994 [KR] Rep. of Korea ............... 1994-22218

[51] Int. Cl.$^6$ .................. C08K 5/523; C08L 51/00; C08L 69/00; C08L 27/12
[52] U.S. Cl. .................. 524/141; 524/127; 524/143; 524/147; 524/151; 524/504; 524/515; 524/520; 524/525; 524/537; 524/521
[58] Field of Search .................. 524/127, 141, 524/143, 147, 151, 537, 504, 515, 520, 525, 522, 521

[56] References Cited

U.S. PATENT DOCUMENTS

| | | | |
|---|---|---|---|
| 5,122,556 | 6/1992 | Kambour | 524/141 |
| 5,204,394 | 4/1993 | Gosens et al. | 524/127 |
| 5,292,786 | 3/1994 | Gaggar et al. | 524/127 |

FOREIGN PATENT DOCUMENTS

| | | | |
|---|---|---|---|
| 0103230 | 3/1984 | European Pat. Off. | 524/127 |
| 0 333 394 | 1/1989 | European Pat. Off. | |
| 0 363 608 | 8/1989 | European Pat. Off. | |
| 0558266 | 9/1993 | European Pat. Off. | 524/127 |
| 4020258 | 1/1992 | Germany | 524/127 |
| 62-4747 | 6/1986 | Japan . | |
| 5-1079 | 8/1991 | Japan . | |

Primary Examiner—Peter A. Szekely
Attorney, Agent, or Firm—Woodcock Washburn Kurtz MacKiewicz & Norris LLP

[57] ABSTRACT

The flameproof thermoplastic resin compositions of this invention comprise from 2 to 20 parts by weight of aromatic diphosphates, from 2 to 7 parts by weight of phosphorous compounds and from 0.1 to 2.0 parts by weight of polyfluoroalkyl resins per 100 parts by weight of the resin mixture consisting of from 60 to 98% by weight of polycarbonate resins, from 2 to 40% by weight of styrene-containing graft copolymer resins, and from 0 to 20% by weight of styrene-containing copolymer resins. The structural formula of said aromatic diphosphates is as follows (I):

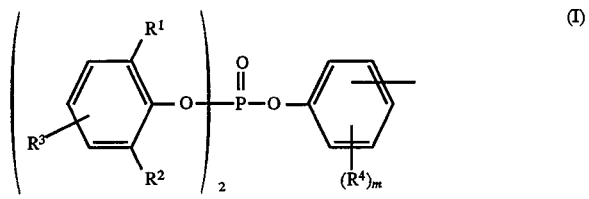

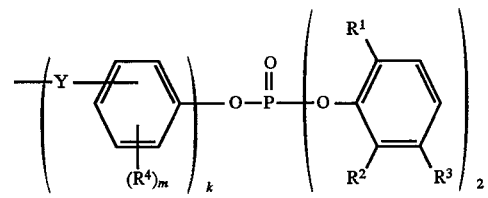

in which, $R^1$ and $R^2$ are same or different lower alkyls, $R^3$ and $R^4$ are same or different hydrogen atom or alkyl groups, Y is a single bond or —$CH_2$—, —$C(CH_3)_2$—, —S—, —$SO_2$—, —O—, —CO—, or —N=N—, k is 0 or 1, and m is an integer of 0 to 4.

7 Claims, No Drawings

FLAMEPROOF THERMOPLASTIC RESIN COMPOSITIONS

FIELD OF THE INVENTION

The present invention relates to flameproof thermoplastic resin compositions, and specifically to those for molding, based on polycarbonate and ABS (acrylonitrile/butadiene/styrene) resins, containing aromatic diphosphates, phosphorous compounds and polyfluoralkyl resins. SAN(styrene/acrylonitrile) copolymer resins may be contained in the base resins comprising the polycarbonate and ABS resins. The thermoplastic resin compositions of the present invention may further contain such additives as inorganic reagents, heat stabilizers, dyes, or pigments in fractions as needed.

BACKGROUND OF THE INVENTION

Flameproof thermoplastic resin compositions have long been in use, and their continuously increasing demand has promoted research and development efforts in the field. Examples of flame retardant thermoplastic resins are resins of polyesters, polyamides, polyethylenes, polyethylene oxides, acrylonitrile/butadiene/styrene (ABS), polyacetals, polystyrenes, and polycarbonates. Among these resins, polycarbonates, which exhibit a glass transition temperature of as high as 150°, high impact and heat resistance, and limited oxygen index(LOI) of up to 25, are widely used for parts of automobiles and electrical appliances owing to their typical flame resistance of UL 94 V2 and high mechanical strength. The impact strength of polycarbonate resins alone, if used as base resin, is sensitively affected by their thickness and notch, however. Considering that a tiny crack on the surface of their molded products seriously deteriorate the impact strength, the use of polycarbonate alone as the base resin is not recommended. It is recommended that other resins be added in order to improve the processability of the polycarbonates. ABS resins, if added to polycarbonates, are known to improve the processability of the polycarbonate resins.

Resins used for housing materials of home appliances and computers must be flame resistant for the sake of fire prevention. Halogen or antimony containing compounds have been used to render flame resistance to thermoplastic resins. These compounds, however, result in the corrosion of the mold itself by the hydrogen halide gases released during the molding process and are fatally harmful due to the toxic gases liberated in the case of fire. As disclosed in European Patent No. 333,694, bromine-substituted phenylphosphates, when used in the preparation of flameproof polycarbonate/ABS resin compositions, enhance the heat resistance, but liberate hydrogen halide gases. The use of polybrominated diphenyl ethers has been prohibited due to the release of toxic gases such as dioxin and difuran during combustion in Germany. Thus, phosphorous compounds have attracted much attention recently because of their good flame resistance in solid phase and little liberation of toxic gases during combustion.

The use of phosphorous compounds to render flame resistance to polycarbonate/ABS resin compositions, as disclosed in Japanese Patent Laid Open No. 62-4717, prevented the dripping of flaming particles during combustion due to the polyfluoroalkyl resins used. This, however, resulted in an unsatisfactory flame resistance and the surface segregation of the flame retarding agent during the molding process, called "juicing", degrading the physical properties of the resin compositions. In order to prevent such a juicing phenomenon, oligomeric phosphate compounds were used in the preparation of polycarbonate/ABS resin compositions to render the flame resistance, as disclosed in European Patent No. 363,608. This improved the heat resistance, but failed to solve the juicing problem completely, and required a complicated mixing apparatus in the extruder because the flame retarding phosphorous compounds were liquid at room temperature.

In this light, the present inventors developed new thermoplastic resin compositions which have a flame resistance of UL 94 VO, good weathering resistance and heat stability, no juicing problem, and improved heat resistance.

An object of the present invention is to provide novel thermoplastic resin compositions with a good flame and weathering resistance, and heat stability, and no juicing problem by adding flame retarding phosphorous compounds and polyfluoroaklyl resins to the resin mixture.

Another object of this invention is to provide flameproof thermoplastic resin compositions with a good processability during molding process.

SUMMARY OF THE INVENTION

The flameproof thermoplastic resin compositions of this invention comprise from 2 to 20 parts by weight of aromatic diphosphates, from 2 to 7 parts by weight of organic monophosphate compounds and from 0.1 to 2.0 parts by weight of polyfluoroaklyl resins per 100 parts by weight of the resin mixture consisting of from 60 to 98% by weight of polycarbonate resins, from 2 to 40% by weight of styrene-containing graft copolymer resins, and from 0 to 20% by weight of styrene-containing copolymer resins. The structural formula of said aromatic diphosphates is as follows (I):

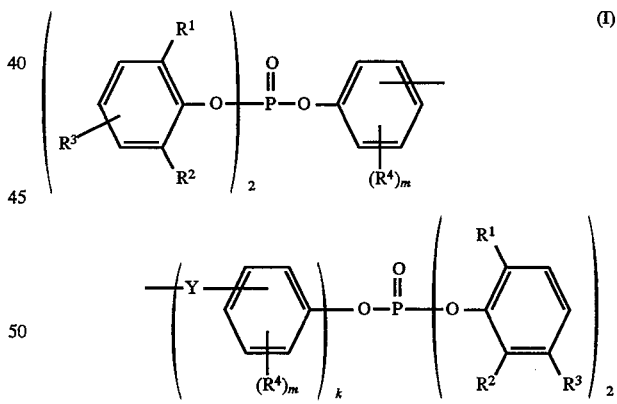

in which, $R^1$ and $R^2$ are same or different lower alkyls, $R^3$ and $R^4$ are same or different hydrogen atom or alkyl groups, Y is a single bond or —$CH_2$—, —$C(CH_3)_2$—, —S—, —$SO_2$—, —O—, —CO—, or —N=N—, k is 0 or 1, and m is an integer of 0 to 4.

The resin compositions of the present invention may further contain additives such as inorganic reagents, heat stabilizers, light stabilizers, pigments, and dyes depending on their applications.

DETAILED DESCRIPTION OF THE INVENTION

Flameproof thermoplastic resin compositions of this invention are characterized by the composition of: (A) 100 parts by weight of the mixture of (a) from 60 to 98% by weight of polycarbonates, (b) from 2 to 40% by weight of styrene-containing graft copolymer resins, (c) from 0 to 20% by weight of styrene-containing copolymers; (B) from 2 to 20 parts by weight of aromatic diphosphates; (C) from 2 to 7 parts by weight of organic monophosphate compounds; and (D) from 0.1 to 2.0 parts by weight of polyfluoralkyl resins.

Polycarbonate resins with various functional groups, i.e., aromatic, aliphatic, and aromatic/aliphatic polycarbonates, may be used. A mixture of these different polycarbonates may also be used. A polycarbonate with aromatic functional groups in its backbone chain preferably is recommended. More specifically, aromatic polycarbonates synthesized from 2,2'-bis(4-hydroxyphenyl) propane may more preferably be used.

Styrene-containing graft copolymer resins, used together with said polycarbonates, are graft copolymers obtained by grafting both at least one selected from a group of styrene, α-substituted styrene, and nucleus-substituted styrene, and at least one selected from a group of acrylonitrile, methylmethacrylate, and N-substituted maleimide with a rubber with a glass transition temperature below 10° C. The stryene-containing graft copolymer resins are obtained by grafting both from 30 to 70% by weight of at least one selected from a group of styrene, α-substituted styrene, and nucleus-substituted styrene and from 15 to 30% by weight of at least one selected from a group of methylmethacrylate, N-substituted maleimide, and acrylonitrile with a rubber whose glass transition temperature is below 10° C. The graft ratio of the graft copolymers exceeds 50.

Rubbers of use for said styrene containing graft copolymer resins are acrylic rubber, butadiene rubber, ethylene/propylene rubber, styrene/butadiene rubber, or acrylonitrile/butadiene rubber, of which acrylic rubber and butadiene rubber are preferably recommended.

Styrene-containing copolymer resins, used together with said polycarbonate resins, are a styrenic copolymer, which is synthesized by copolymerizing from 50 to 80% by weight of at least one selected from a group of styrene, α-substituted styrene, and nucleus-substituted styrene and from 15 to 20% by weight of at least one selected from a group of methylmethacrylate, N-substituted maleimide, and acrylonitrile.

Aromatic diphosphates used in the present invention are disclosed in Japanese Patent Laid Open No. 5-1079, and have the following formula:

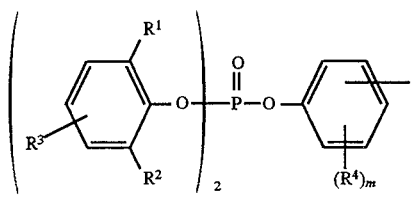

-continued

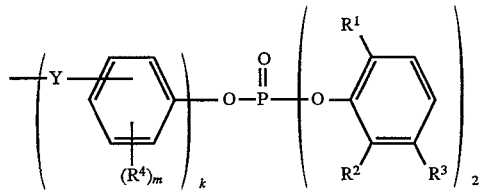

in which, $R^1$ and $R^2$ are same or different lower alkyls, $R^3$ and $R^4$ are same or different hydrogen atom or alkyl groups, Y is a single bond or —$CH_2$—, —$C(CH_2)_2$—, —S—, —$SO_2$—, —O—, —CO—, or —N=N—, k is 0 or 1, and m is an integer of 0 to 4.

Said aromatic diphosphates are crystalline powders, and the representative examples are the following compounds, (II), (III) and (IV):

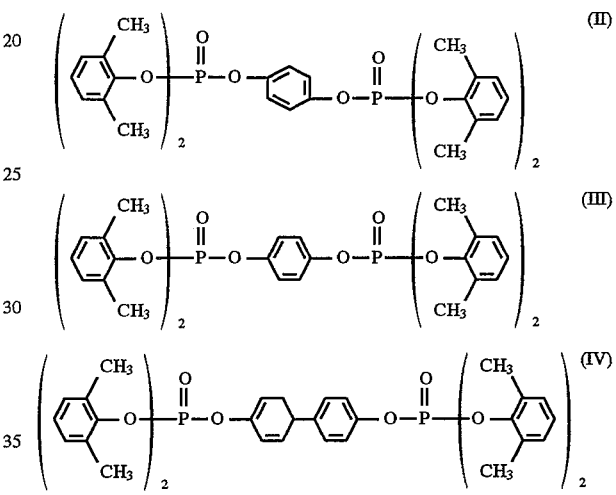

From 2 to 20 parts by weight of aromatic diphosphates per 100 parts by weight of the base resin are used in the present invention.

Examples of organic monophosphate compounds usable in this invention are trialkyl phosphates such as trimethyl phosphate, triethyl phosphate, tributyl phosphate and trioctyl phosphate; triaryl phosphates such as triphenyl phosphate, tricresyl phosphate, trixylenyl phosphate, xylenytdiphenyl phosphate, and cresyldiphenyl phosphate; and alkylaryl phosphates such as octyldiphenyl phosphate. Triaryl phosphates may be more preferably used. The most preferable orgainic monophosphate compound is triphenyl phosphate which exists in a solid state at room temperature. One or more of the orgainic monophosphate compounds above may be used in the thermoplastic resin compositions of this invention. From 2 to 7 parts by weight of organic monophosphate compounds per 100 parts by weight of the base resin are used in the present invention.

Examples of polyfluoroaklyl resins, those of traditional use, are polytetrafluoroethylene, polyvinylidenefluoride, copolymer of polytetrafluoroethylene and polyvinylidenefluoride, copolymer of tetrafluoroethylene and fluoroalkylvinylether, and copolymer of tetrafluoroethylene and hexafluoropropylene. These resins may be used separately or in a mixture of two or more. The fluorine content of these polyfluoralkyl resins must be from 39 to 76% by weight. From 0.1 to 2.0 parts by weight of polyfluoralkyl resins per 100 parts by weight of the base resin may be used.

The resin compositions of the present invention may further contain additives such as inorganics, heat stabilizers, oxidation inhibitors, light stabilizers, pigments, and/or dyes depending on specific applications. Examples of inorganic additives are asbestos, glass fiber, talc, or ceramic and are used in from 0 to 30 parts by weight per 100 parts by weight of polycarbonates or polycarbonates containing ABS resins.

Thermoplastic resin compositions of the present invention, comprising aromatic diphosphates, organic monophosphate compounds and polyfluoroaklyl resins based on polycarbonate resins, styrene-containing graft copolymer resins, and styrene-containing copolymer resins, do not liberate toxic gases during combustion unlike those with halogen containing flame retarding agents, do not have the surface segregation problem such as juicing phenomenon, and show improved heat resistance. The thermoplastic resin compositions have a good processability during molding process.

For the preparation of the thermoplastic resin compositions of this invention, aromatic diphosphates, orgainic monophorphate compounds and polfluoroalkyl resins are first mixed with base resins consisting of polycarbonates, styrene-containing graft copolymer resins, and styrene-containing copolymer resins. Inorganic additives, heat stabilizers, oxidation inhibitors, light stabilizers, dyes and/or pigments are then added to the mixture in a mixer. This final mixture is extruded through an extruder into molded compositions in pellet forms.

The invention may be better understood by reference to the following examples which are intended for the purpose of illustration and are not to be construed as in any way limiting the scope of the present invention, which is defined in the claims appended hereto.

EXAMPLES

Preparation and specifics of: (A) the components of the base resins, i.e., (a) polycarbonate resins, (b) styrene containing graft copolymer resins, and (c) styrene-containing copolymer resins; (B) aromatic diphosphates; (C) orgainic monophosphate compounds and (D) polyfluoroalkyl resins, which are an used in Examples 1–3 and Comparative Examples 1–3, are as follows:

(A) Base resins (a) Polycarbonate resins: L-1250W Grade of Teijin, Inc. of Japan was used.

(b) Styrene-containing graft copolymer resins: For the preparation of styrene-containing graft copolymer resins, the mixture of 50 grams of butadiene rubber latex powder, 36 grams of styrene, 14 grams of acrylonitrile, and 150 grams of deionized water was allowed for 5 hours at 75° C. to react with 1.0 gram of potassium oleic acid, 0.4 gram of cumenhydroperoxide, 0.3 gram of a grafting reagent. The styrene-containing graft copolymer was then obtained by adding 4 grams of sulfuric acid to the resin compositions prepared from the above reaction.

(c) Styrene-containing copolymer resins: Styrene-containing copolymer resins were obtained by suspension polymerization of the mixture of 70 grams of styrene, 30 grams of acrylonitrile, and 120 grams of deionized water with the additives of 0.2 gram of azobisisobutylonitrile and 0.5 gram of tricalciumphosphate. The reaction product was rinsed, dehydrated, and dried to give the powdery styrene-containing copolymer resin.

(B) Aromatic diphosphate

Aromatic diphosphates of the structure (II) were prepared according to Japanese Patent Laid Open No. 5-1079 as follows:

244 grams of 2,6-xylenol, 20 grams of xylene, and 1.5 grams of $MgCl_2$ were mixed under a heating condition in a branched flask with which a stirrer, a thermometer, a burette, and a condenser were equipped. When the temperature of the reaction mixture reached 120° C., 150 grams of oxychlorophosphate was dropped to the mixture over a 2 hour period. Hydrogen chloride gas released in this process was removed by the condenser. Upon the completion of the oxychlorophosphate chopping, the temperature of the reaction mixture was raised slowly to 180° C. over a 2 hour period. 55 grams of resorcinol and 1.5 grams of $MgCl_2$ were added under a heating condition to 345 grams of di(2,6-xylenyl)chlorophosphate obtained from the above process in a flask, and the removal of HCl was carried out by slowly heating the mixture to 180° C. over a 2 hour period. The resultant reaction mixture was kept at 180° C. for 2 hours, and then at a reduced pressure of 200 mmHg for 2 additional hours. The remaining catalysts were removed from the reaction mixture by adding 500 grams of xylene and 200 grams of 10% aqueous HCl and while stirring the mixture. The mixture was then rinsed, stirred, and cooled to room temperature to give the precipitated product. The precipitate was separated by filtering from the solution mixture, rinsed with 200 grams of methanol, and then dried under a reduced pressure to obtain said compound with a structure (II).

(C) Organic monophosphate compounds: Conventional triphenyl phosphate was (D) Polyfluoroaklyl resins: Teflon(trademark) 7AJ of Dupont, Inc. of the U.S.A. was used.

EXAMPLES 1–3 AND COMPARATIVE EXAMPLES 1–3

Compositions of each component used in Examples 1–3 and Comparative Examples 1–3 are shown in Table 1. For the oxidation inhibitor, 0.2 gram of hindered phenol or a phosphite compound was used in Examples 1–3 and Comparative Examples 1–3.

In Examples 1–3 and Comparative Examples 1–3, all components were mixed and extruded into resin compositions in pellet forms at 250° C. These resin compositions were injection-molded into test specimens.

TABLE 1

|     |                                          | Example 1 | Example 2 | Example 3 | Comp. Ex. 1 | Comp. Ex. 2 | Comp. Ex. 3 |
|-----|------------------------------------------|-----------|-----------|-----------|-------------|-------------|-------------|
| (A) | (a) Polycarbonate Resins                 | 90        | 80        | 70        | 90          | 80          | 70          |
|     | (b) Styrene - Containing Graft Copolymer Resins | 10 | 10 | 18 | 10 | 10 | 18 |
|     | (c) Styrene - Containing Copolymer Resins | 0        | 10        | 12        | 0           | 10          | 12          |
| (B) | Aromatic Diphosphate                     | 7         | 10        | 14        | —           | 14          | —           |
| (C) | Organic monophosphate Compound           | 3         | 3         | 3         | 10          | —           | —           |
| (D) | Polyfluoroalkyl Resins                   | 1.0       | 1.0       | 1.0       | 1.0         | 1.0         | 1.0         |
|     | Br-Substituted Epoxy Resin               | —         | —         | —         | —           | —           | 16          |

All numbers are in grams.

Flame resistance, heat stability, juicing tests and processability have been performed for the resin compositions prepared according to Examples 1–3 and Comparative Examples 1–3. The test results are shown in Table 2.

TABLE 2

|                       | Example 1 | Example 2 | Example 3 | Comp Ex. 1 | Comp Ex. 2 | Comp Ex. 3 |
|-----------------------|-----------|-----------|-----------|------------|------------|------------|
| UL 94 (1/16)*         | V-0       | V-0       | V-0       | V-0        | V-0        | V-0        |
| Heat Resistance (VST)** | 115     | 106       | 94        | 106        | 92         | 80         |
| Juicing***            | No        | No        | No        | Yes        | Yes        | Yes        |
| Processability****    | ⊙         | ⊙         | ⊙         | ⊙          | Δ          | Δ          |

*Tested according to UL 94 VB.
**Tested according to ASTM D 306.
***Observed specimens kept for 24 hours in an 80° C. oven using an optical microscopy.
(Yes: Juicing was observed, No: No juicing was observed).
****Processability: Observed by human eyes (⊙; very good, Δ; bad)

What is claimed is:

1. A flameproof thermoplastic resin composition comprising:
   (A) 100 parts by weight of a base resin comprising:
      (i) from 60 to 98% by weight of a polycarbonate resin;
      (ii) from 2 to 40% by weight of a styrene-containing graft copolymer resin; and
      (iii) from 0 to 20% by weight of a styrene-containing copolymer resin;
   (B) from 2 to 20 parts by weight of an aromatic diphosphate compound of the following formula

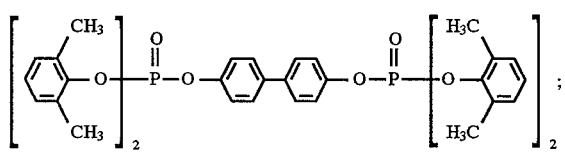

(C) from 2 to 7 parts by weight of an organic monophosphorous compound; and
   (D) from 0.1 to 2.0 parts by weight of a polyfluoroalkyl resin.

2. The thermoplastic resin composition according to claim 1 wherein said polyfluoroalkyl resin is selected from the group consisting of polytetrafluoroethylene, polyvinylidenefluoride, a copolymer of polytetrafluoroethylene and polyvinylidenefluoride, a copolymer of tetrafluoroethylene and a fluoroalkylvinylether, and a copolymer of tetrafluoroethylene and hexafluoropropylene.

3. The thermoplastic resin composition according to claim 1 wherein said rubber is selected from the group consisting of acrylic rubber, butadiene rubber, ethylene/propylene rubber, styrene/butadiene rubber, and acrylonitrile/butadiene rubber.

4. The thermoplastic resin composition according to claim 1 further comprising an inorganic filler, a heat stabilizer, an oxidation inhibitor, a light stabilizer, a pigment or a dye or a mixture thereof.

5. The thermoplastic resin composition according to claim 1 wherein said styrene-containing graft copolymer is prepared by the graft-copolymerization of: (A) from 15 to 60% by weight of a rubber having a glass transition temperature of less than 10° C.; (B) from 30 to 70% by weight of an organic material selected from the group consisting of styrene, α-substituted styrene, and nucleus-substituted styrene; and (C) from 15 to 30% by weight of an organic material selected from the group consisting of methylmethacrylate, N-substituted maleimide and acrylonitrile.

6. The thermoplastic resin composition according to claim 5 wherein said styrene-containing graft copolymer has a graft index of 50 or greater.

7. The thermoplastic resin composition according to claim 1 wherein said styrene-containing copolymer is prepared by the copolymerization of: (A) from 50 to 80% by weight of an organic material selected from the group consisting of styrene, α-substituted styrene, and nucleus-substituted styrene; and (B) from 20 to 50% by weight of an organic material selected from the group consisting of methylmethacrylate, N-substituted maleimide and acrylonitrile.

* * * * *